United States Patent
Lee et al.

(10) Patent No.: US 11,015,802 B2
(45) Date of Patent: May 25, 2021

(54) BURNER USING HIGH-TEMPERATURE COMBUSTION CATALYST

(71) Applicant: SungGwang E&Tech Co., Ltd., Gyeonggi-do (KR)

(72) Inventors: Kyung Woo Lee, Hwaseong-si (KR); You Shick Jung, Gyeongsan-si (KR)

(73) Assignee: SungGwang E&Tech Co., Ltd., Gyeonggi-do (KR)

( * ) Notice: Subject to any disclaimer, the term of this patent is extended or adjusted under 35 U.S.C. 154(b) by 288 days.

(21) Appl. No.: 16/079,104

(22) PCT Filed: Feb. 23, 2017

(86) PCT No.: PCT/KR2017/001988
§ 371 (c)(1),
(2) Date: Aug. 23, 2018

(87) PCT Pub. No.: WO2018/030604
PCT Pub. Date: Feb. 15, 2018

(65) Prior Publication Data
US 2019/0285271 A1 Sep. 19, 2019

(30) Foreign Application Priority Data
Aug. 8, 2016 (KR) .................. 10-2016-0100637

(51) Int. Cl.
*F23C 13/08* (2006.01)
*B01J 23/34* (2006.01)
(Continued)

(52) U.S. Cl.
CPC .............. *F23C 13/08* (2013.01); *B01J 23/34* (2013.01); *B01J 31/02* (2013.01); *B01J 37/03* (2013.01);
(Continued)

(58) Field of Classification Search
CPC .......... F23D 14/18; F23D 14/02; F23D 14/62; F23C 13/08; F23C 13/02;
(Continued)

(56) References Cited

U.S. PATENT DOCUMENTS 4,400,356 A * 8/1983 McVay ..................... F23G 7/07
422/171
4,415,537 A * 11/1983 Vine ....................... B01J 23/63
422/180
(Continued)

FOREIGN PATENT DOCUMENTS

| JP | 07-324703 | 12/1995 |
|---|---|---|
| JP | 2567992 | 10/1996 |

(Continued)

OTHER PUBLICATIONS

Translation of International Search Report dated May 31, 2017 From the International Searching Authority Re. Application No. PCT/KR2017/001988. (2 Pages).

*Primary Examiner* — Daniel E. Namay

(57) ABSTRACT

A burner using a high-temperature combustion catalyst is disclosed. The disclosed burner using a high-temperature combustion catalyst comprises: a mixing and dispensing unit for mixing and dispensing fuel gas and air, which are to be supplied; a combustion catalyst unit for generating heat by catalytically combusting with the fuel gas to be supplied from the mixing and dispensing unit; and a premixing chamber for preliminarily mixing a combustion gas which is to enter the combustion catalyst unit while connecting the mixing and dispensing unit and the combustion catalyst unit, wherein the combustion catalyst unit comprises: a front/rear-open housing having a chamber therein; perforated plates provided on the front and rear surfaces of the housing so as to allow the fuel gas to pass through from the rear of the housing to the front thereof; a pellet-type combustion cata-
(Continued)

lyst filled inside of the chamber of the housing; and a heat source means for generating a heat source for the catalytic combustion of the combustion catalyst. The high-temperature combustion catalyst further comprises preparation by the steps of: preparing a metal precursor solution containing a transition metal nitrate, an alkaline earth metal nitrate, and aluminum nitrate; preparing a precipitation solution; preparing a mixture solution by mixing the metal precursor solution and the precipitation solution; increasing the temperature of the mixture solution to 90~100° C. and maintaining the same for 10~48 hours so as to cause precipitation; separating a precipitate slurry, which is formed by precipitation, from the mixture solution by filtering the same; washing the precipitate slurry; performing drying in order to remove water contained in the washed precipitate slurry; and performing firing at 1,000~1,500° C. in order to remove water remaining in the dried precipitate slurry.

9 Claims, 13 Drawing Sheets

(51) Int. Cl.
  *B01J 31/02* (2006.01)
  *B01J 37/03* (2006.01)
  *B01J 37/08* (2006.01)
  *F23D 14/02* (2006.01)
  *F23C 13/02* (2006.01)
  *F23D 14/18* (2006.01)
(52) U.S. Cl.
  CPC .............. *B01J 37/08* (2013.01); *F23D 14/02* (2013.01); *F23C 13/02* (2013.01); *F23C 2900/13001* (2013.01); *F23D 14/18* (2013.01)
(58) Field of Classification Search
  CPC ............ F23C 2900/13001; F23C 10/01; F23N 2237/12; B01J 37/03; B01J 37/08
  USPC .................. 431/7, 267, 170, 268; 422/211
  See application file for complete search history.

(56) References Cited

U.S. PATENT DOCUMENTS

| | | | | |
|---|---|---|---|---|
| 5,975,890 | A | * 11/1999 | Kawasaki | F23D 14/18 431/328 |
| 5,993,192 | A | * 11/1999 | Schmidt | F23D 14/18 431/12 |
| 6,015,285 | A | * 1/2000 | McCarty | B01J 19/2485 431/7 |
| 6,145,501 | A | * 11/2000 | Manohar | F23C 13/00 126/11 OR |
| 2006/0035190 | A1 | * 2/2006 | Hoetger | F23D 14/145 431/329 |
| 2006/0225347 | A1 | * 10/2006 | Lee | H01M 8/0631 48/127.9 |
| 2010/0158788 | A1 | * 6/2010 | Kim | B82Y 40/00 423/447.2 |
| 2013/0303813 | A1 | * 11/2013 | Cabiac | B01J 37/0242 585/277 |
| 2014/0220501 | A1 | * 8/2014 | Lindstrom | F23D 11/402 431/160 |

FOREIGN PATENT DOCUMENTS

| | | |
|---|---|---|
| JP | 10-281012 | 10/1998 |
| JP | 2002-106810 | 4/2002 |
| KR | 0151641 | 3/1997 |
| KR | 10-0254832 | 2/2000 |
| KR | 10-0257551 | 6/2000 |
| KR | 10-0371208 | 1/2003 |
| KR | 10-0392702 | 7/2003 |
| KR | 10-0550653 | 2/2006 |
| KR | 10-2014-0094127 | 7/2014 |

* cited by examiner

BURNER USING HIGH-TEMPERATURE COMBUSTION CATALYST

RELATED APPLICATIONS

This application is a National Phase of PCT Patent Application No. PCT/KR2017/001988 having International filing date of Feb. 23, 2017, which claims the benefit of priority of Korean Patent Application No. 10-2016-0100637 filed on Aug. 8, 2016. The contents of the above applications are all incorporated by reference as if fully set forth herein in their entirety.

FIELD AND BACKGROUND OF THE INVENTION

The present invention relates to a burner using a high-temperature combustion catalyst.

In particular, the present invention relates to a burner using a high-temperature combustion catalyst in which, although a relatively inexpensive transition metal material is used instead of an expensive precious metal catalyst which has been used as an existing high-temperature combustion catalyst, lean combustion, complete combustion, and theoretical combustion are enabled.

Catalytic combustion devices are devices in which a combustible gas is burned by reaction upon contact with a solid catalyst. Since a combustion reaction occurs at a lower temperature than that of existing flame combustion burners due to the occurrence of a combustion reaction at a surface of the catalyst and the combustion reaction stably occurs even when a low concentration of fuel is used, these catalytic combustion devices are effectively used in fields requiring low-temperature heat, such as fibers or plastics.

However, to obtain high combustion efficiency by a stable combustion reaction in a catalytic combustion device, it is necessary to maintain the temperature of a catalyst layer, where a catalytic combustion reaction directly occurs, at a catalytic combustion initiation reaction temperature or higher.

In addition, since the catalytic combustion reaction occurs by contact between a gas and a solid, catalytic combustion devices should have a structure that enables combustion catalysts made in various forms to satisfactorily come into contact with a combustible gas, such that the combustion reaction satisfactorily occurs and high combustion efficiency can be obtained.

Such catalytic combustion devices may be configured in a variety of forms according to a method of maintaining the temperature of a catalyst layer and a method of bringing a gas into contact with a solid, and specific examples thereof include structures disclosed in Korean Patent Nos. 151641, 254832, 257551, 371208, 392702, and 550653.

Combustion catalysts used in catalytic combustion devices are made in a variety of forms such as a honeycomb, a pellet, a mat, and the like, and the type of combustion catalyst is determined according to a method of using combustion heat. That is, a catalytic combustion device using a honeycomb-type combustion catalyst mainly uses hot air, whereas a catalytic combustion burner using a mat-type combustion catalyst uses heat in a radiant heat transfer manner, rather than using hot air. A material heated due to the occurrence of a flameless combustion reaction can be provided adjacent to a catalytic burner, and thus the mat-type catalytic combustion burner has very high heat transfer efficiency while having a low combustion load.

In catalytic combustion burners using a mat-type combustion catalyst, which are used in plants, combustion air is supplied mostly in a diffusion manner. In these catalytic combustion burners, when combustion occurs in an exposed space, combustion efficiency and heat transfer efficiency are very high, but since oxygen cannot be smoothly supplied in a closed space, combustion air is forcibly supplied (Korean Patent No. 151641) or a gas mixture of a fuel and air is previously supplied for combustion (Korean Patent No. 371208).

However, in diffusion-type catalytic combustion burners in which a combustion reaction occurs by forcibly supplying air in the exposed space or from the outside, the reaction rate is determined by the diffusion rate of oxygen, and thus combustion efficiency is decreased as combustion load increases, and accordingly, there are many limitations in applications.

Thus, as in catalytic combustion devices using a honeycomb-type combustion catalyst, mat-type catalytic combustion burners also partially use a method of performing combustion by supplying a pre-mixture of air and a fuel. These premixing-type catalytic combustion devices, to which a pre-mixture of a fuel and air is supplied, should be configured such that the temperature of a catalyst layer is maintained at a catalytic combustion reaction initiation temperature or higher within a heat resistance temperature of a catalyst. When the temperature of the catalyst layer is lower than the catalytic combustion reaction initiation temperature, incomplete combustion occurs, and thus combustion efficiency is very low, or combustion does not occur. When the temperature of the catalyst layer is too high, the lifespan of a catalyst is decreased.

General premixing-type catalytic combustion burners, which use a honeycomb-type combustion catalyst, are operated at an excess air ratio of 1.1 to 2.0, whereas premixing-type fiber mat catalytic combustion burners (Korean Patent No. 371208) are operated at a high excess air ratio (approximately 3.5 to 4.0) to protect a catalyst such that the temperature of a catalyst layer is not raised to a heat resistance temperature or higher.

In addition, in such premixing-type catalytic combustion burners, a catalytic combustion reaction does not smoothly occur due to rapid linear velocity according to the high excess air ratio, and thus complete combustion is difficult to achieve. To address these problems, a large amount of combustion catalyst is used to bring as much fuel as possible into contact with the catalyst so that reaction satisfactorily occurs. However, when a large amount of combustion catalyst is used in manufacturing a mat-type catalytic combustion burner, manufacturing costs of the catalytic combustion burner rapidly increase, which is not suitable because combustion catalyst purchase costs account for a very high proportion of the total manufacturing costs.

A combustion catalyst made in a mat form uses a precious metal such as platinum, rhodium, or the like, and thus is expensive, and since a large amount of combustion catalyst should be used in manufacturing a burner, catalyst combustion burner costs are inevitably high. Thus, mat-type catalytic combustion burners cannot be widely used industrially.

SUMMARY OF THE INVENTION

Therefore, the present invention has been made in view of the above problems, and it is one object of the present invention to provide a burner using a high-temperature combustion catalyst in which, although a relatively inexpensive transition metal material is used instead of an expensive precious metal catalyst which has been used as an existing high-temperature combustion catalyst, lean combustion, complete combustion, and theoretical combustion are enabled.

However, technical problems to be solved by the present invention are not limited to the above-described technical problems, and other unmentioned technical problems will become apparent from the following description to those of ordinary skill in the art.

In accordance with one aspect of the present invention, provided is a burner using a high-temperature combustion catalyst, the burner including: a mixing and dispensing unit configured to mix a fuel gas and air, which are to be supplied, and dispense the mixture; a combustion catalyst unit configured to generate heat by a catalytic combustion reaction with the fuel gas supplied from the mixing and dispensing unit; and a premixing chamber configured to pre-mix the fuel gas introduced into the combustion catalyst unit while connecting the mixing and dispensing unit to the combustion catalyst unit, wherein the combustion catalyst unit includes: a housing having a chamber therein and openings at front and rear sides thereof; perforated plates installed on front and rear surfaces of the housing and allowing the fuel gas to pass from the rear side to the front side of the housing; a pellet-type combustion catalyst with which an inside of the chamber of the housing is filled; and a heat source means configured to generate a heat source for catalytic combustion of the combustion catalyst, and the high-temperature combustion catalyst is prepared by preparing a metal precursor solution including a transition metal nitrate, an alkaline earth metal nitrate, and aluminum nitrate; preparing a precipitation solution; preparing a mixed solution by mixing the metal precursor solution and the precipitation solution; raising a temperature of the mixed solution to 90° C. to 100° C. and holding the mixed solution at 90° C. to 100° C. for 10 hours to 48 hours to cause a precipitation reaction; filtering a precipitate slurry formed by the precipitation reaction to be separated from the mixed solution; washing the precipitate slurry with water; drying the washed precipitate slurry to remove moisture therefrom; and performing calcination at 1,000° C. to 1,500° C. to remove moisture remaining in the dried precipitate slurry.

Preferably, the heat source means may be an ignition unit installed at the front side of the housing and configured to perform catalytic combustion of the high-temperature combustion catalyst by ignition heat.

Preferably, the heat source means may be an electric furnace or electric heater installed such that the heat source means covers an outside of the housing, and configured to perform catalytic combustion on the high-temperature combustion catalyst.

Preferably, the housing may be provided, at edge surfaces thereof, with catalyst replacement holes through which the high-temperature combustion catalyst is discharged and introduced, for replacement of the high-temperature combustion catalyst, wherein the catalyst replacement holes may be selectively opened or closed by thread caps.

Preferably, assuming that a combustion gas hourly space velocity (GHSV) of the combustion catalyst unit ranges from 1,000 $h^{-1}$ to 30,000 $h^{-1}$, the combustion catalyst unit has a volume of 1 L to 1.5 L, and the high-temperature combustion catalyst has a density of 0.5 g/ml to 1 g/ml and a porosity (a ratio of space volume to total volume of the combustion catalyst) of 0.3% to 0.5%, such that a ratio of pressure drop at a discharge side of the combustion catalyst unit to pressure drop in the premixing chamber may be maintained within 20%.

Preferably, the high-temperature combustion catalyst may have pores therein and any one form selected from a cylindrical form, a hexahedral form, and a spherical form.

Preferably, the high-temperature combustion catalyst may be a hexa-aluminate-based catalyst.

Preferably, the housing may be made of stainless or Hastelloy, the stainless steel or Hastelloy being a heat-resistant material.

Preferably, the mixing and dispensing unit may include: a blowing fan configured to blow the fuel gas and the air towards the combustion catalyst unit; and a static mixer configured to mix the fuel gas and the air that are blown by the blowing fan.

As is apparent from the foregoing technical solution, although a high-temperature combustion catalyst not including a precious metal and consisting of a transition metal component that has high durability at a high temperature and is relatively inexpensive, lean combustion, complete combustion, and theoretical combustion are enabled, and thus carbon monoxide is hardly generated and the generation of a nitrogen oxide ($NO_x$) hardly occurs, and accordingly, it is environmentally friendly, economical, and thermally efficient.

DESCRIPTION OF SPECIFIC EMBODIMENTS OF THE INVENTION

Figure 1:
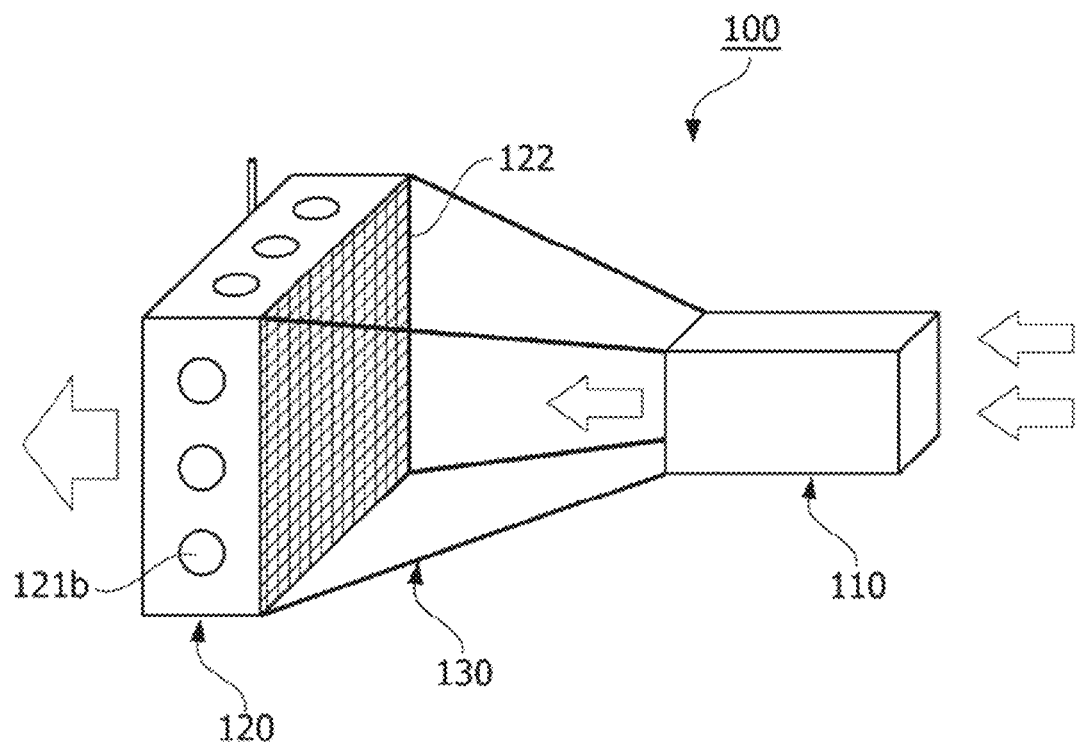
FIG. 1 is a configuration view of a burner using a high-temperature combustion catalyst, according to an embodiment of the present invention.

The present invention provides a burner using a high-temperature combustion catalyst, the burner including: a mixing and dispensing unit configured to mix a fuel gas and air, which are to be supplied, and dispense the mixture; a combustion catalyst unit configured to generate heat by a catalytic combustion reaction with the fuel gas supplied from the mixing and dispensing unit; and a premixing chamber configured to pre-mix the fuel gas introduced into the combustion catalyst unit while connecting the mixing and dispensing unit to the combustion catalyst unit, wherein the combustion catalyst unit includes: a housing having a chamber therein and openings at front and rear sides thereof; perforated plates installed on front and rear surfaces of the housing and allowing the fuel gas to pass from the rear side to the front side of the housing; a pellet-type combustion catalyst with which an inside of the chamber of the housing is filled; and a heat source means configured to generate a heat source for catalytic combustion of the combustion catalyst, and the high-temperature combustion catalyst is prepared by preparing a metal precursor solution including a transition metal nitrate, an alkaline earth metal nitrate, and aluminum nitrate; preparing a precipitation solution; preparing a mixed solution by mixing the metal precursor solution and the precipitation solution; raising a temperature of the mixed solution to 90° C. to 100° C. and holding the mixed solution at 90° C. to 100° C. for 10 hours to 48 hours to cause a precipitation reaction; filtering a precipitate slurry formed by the precipitation reaction to be separated from the mixed solution; washing the precipitate slurry with water; drying the washed precipitate slurry to remove moisture therefrom; and performing calcination at 1,000° C. to 1,500° C. to remove moisture remaining in the dried precipitate slurry.

Mode

Hereinafter, embodiments of the present invention will be described in detail with reference to the accompanying drawings. Like reference numerals in the drawings denote like elements, and a detailed description thereof will be provided once.

Embodiments of the present invention are provided to more fully explain the present invention to those of ordinary skill in the art, and embodiments set forth herein may be changed in many different forms and are not intended to limit the scope of the present invention. Rather, these embodiments are provided so that this disclosure will be through and complete, and will fully convey the scope of the present invention to those of ordinary skill in the art.

In the present specification, it will be obvious that, although the terms first, second, etc., may be used herein to describe various members, components, regions, layers, sections, and/or elements, these members, components, regions, layers, sections, and/or elements should not be limited by these terms. These terms do not indicate particular order, positional relationship, or rating and are used only to distinguish one member, region, portion, or element from another member, region, portion, or element. Thus, a first member, region, portion, or element, which will be described below, may be referred to as a second member, region, portion, or element without departing from the teachings of the present invention. For example, a first element may be denoted as a second element and a second element may also be denoted as a first element without departing from the scope of the present invention.

Unless otherwise defined, all terms including technical and scientific terms used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art, and will not be interpreted in an overly formal sense unless expressly so defined herein.

When an embodiment may be implemented in a different way, a certain manufacturing process may be performed differently from the described order. For example, two consecutively described processes may be performed substantially at the same time, or may be performed in an order opposite to the described order.

In the accompanying drawings, variations from the shapes of the illustrations as a result, for example, of manufacturing techniques and/or tolerances, are to be expected. Thus, embodiments of the present invention should not be construed as limited to the particular shapes of regions illustrated herein but are to include changes in shapes that result, for example, from manufacturing.

Figure 2:
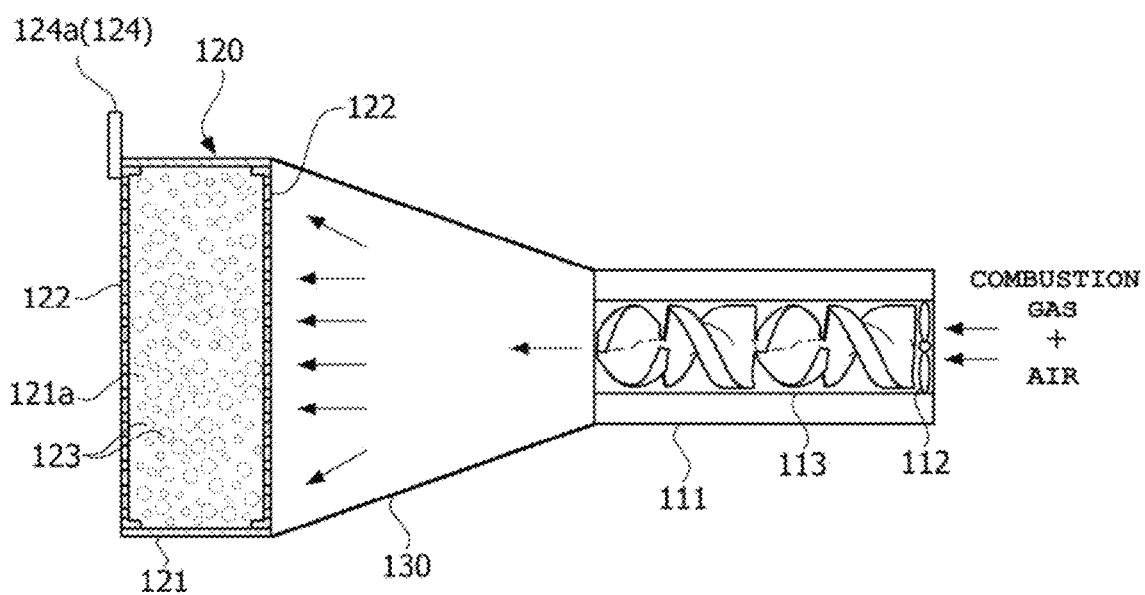
FIG. 2 is a cross-sectional view of FIG. 1.

FIG. 1 is a configuration view of a burner using a high-temperature combustion catalyst, according to an embodiment of the present invention. FIG. 2 is a cross-sectional view of FIG. 1.

As illustrated in FIGS. 1 and 2, a catalytic combustion burner 100 according to the present invention may include a mixing and dispensing unit 110, a combustion catalyst unit 120, and a premixing chamber 130.

First, as illustrated in FIG. 2, the mixing and dispensing unit 110 is configured to mix a fuel gas and air, which are to be supplied, and dispense the mixture, and may include a duct 111, a blowing fan 112 installed inside of the duct 111 and configured to blow the fuel gas and the air towards the combustion catalyst unit 120, and a mixer 113 configured to mix the fuel gas and the air that are blown by the blowing fan 112.

In this regard, as the mixer 113, an unpowered static mixer capable of uniformly mixing a fluid, a gas, or powder without a separate movement may be applied. In such a static mixer, a screw-type flow path is formed, and thus mixing occurs such that the fuel gas and the air are stirred while passing through the flow path.

The combustion catalyst unit 120 is configured to perform catalytic combustion, and the catalytic combustion refers to combustion occurring by contact reaction of a material, such as a catalyst, with a combustible gas (natural gas, city gas, or the like) as a fuel and oxygen in the air. When combustion occurs, a catalytic material serves as a facilitator that does not change itself but participates in combustion and promotes reaction. In this regard, the fuel gas and oxygen are instantaneously adsorbed to and reacted with a catalyst, and then heat is generated and the reaction products, i.e., carbon dioxide and water, are instantaneously desorbed from the catalyst. That is, catalytic combustion refers to combustion occurring while absorption of these reactants and desorption of these reaction products are repeated. Thus, since a combustion reaction occurs by a catalyst, an effect of significantly reducing the generation of nitrogen oxide ($NO_x$) from low-temperature and low-concentration combustion may be obtained.

The combustion catalyst unit 120 may include: a housing 121 having a chamber 121a therein and openings at front and rear sides thereof; perforated plates 122 installed on front and rear surfaces of the housing 121 and allowing the fuel gas to pass from the rear side to the front side of the housing; a pellet-type high-temperature combustion catalyst 123 with which an inside of the chamber 121a of the housing 121 is filled; and a heat source means 124 configured to generate a heat source for catalytic combustion of the high-temperature combustion catalyst 123.

In this regard, optimal conditions for increasing catalytic efficiency of the combustion catalyst unit 120 may be configured such that, assuming that a combustion gas hourly space velocity (GHSV) of the combustion catalyst unit ranges from 1,000 $h^{-1}$ to 30,000 $h^{-1}$, the combustion catalyst unit 120 has a volume of 1 L to 1.5 L, and the high-temperature combustion catalyst 123 has a density of 0.5 g/ml to 1 g/ml and a porosity (a ratio of space volume to total volume of a combustion catalyst) of 0.3% to 0.5%. Accordingly, a ratio of pressure drop at a discharge side of the combustion catalyst unit 120 to pressure drop in the premixing chamber 130 may be maintained within 20%.

In addition, the housing 121 may be made of stainless or Hastelloy, which is a heat-resistant material. Hastelloy is an alloy based on nickel, molybdenum, and iron, has, at high temperatures, excellent mechanical properties and high oxidation resistance, and is most widely used mainly in gas turbine blades, castings for heat treatment furnaces, heating devices for carburizing, and the like, and stainless has a melting point of 1,427° C. to 1,510° C. (18 chromium steel) and 1,400° C. to 1,454° C. (18-8 series), and thus has high resistance to high temperatures. Thus, these materials may be suitable for use as a housing of a high-temperature combustion unit.

Figure 3:
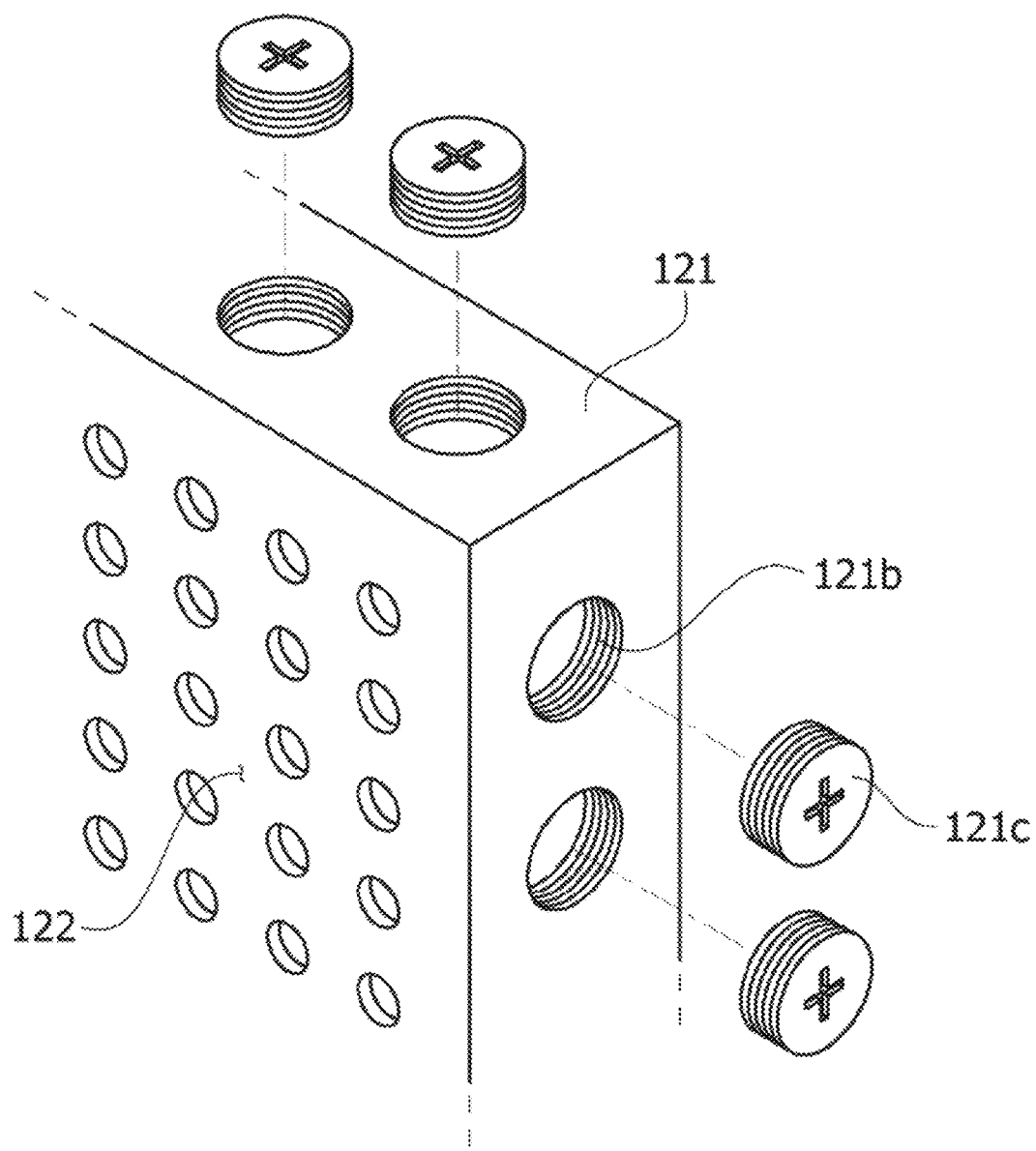
FIG. 3 is a detailed perspective view of a housing.

In addition, as illustrated in FIG. 3, the housing 121 is provided, at edge surfaces thereof, with catalyst replacement holes 121b through which the high-temperature combustion catalyst is discharged and introduced, for replacement of the high-temperature combustion catalyst 123, and the catalyst replacement holes 121b may be selectively opened or closed by thread caps 121c.

Thus, when the high-temperature combustion catalyst 123 is replaced, the thread caps 121c are separated and the catalyst replacement holes 121b are opened, the existing high-temperature combustion catalyst 123 inside the housing 121 is discharged through the catalyst replacement holes 121b and a new high-temperature combustion catalyst 123 is introduced therethrough, and then the catalyst replacement holes 121b are sealed by the thread caps 121c, thereby simply completing a replacement operation.

Figure 5A:
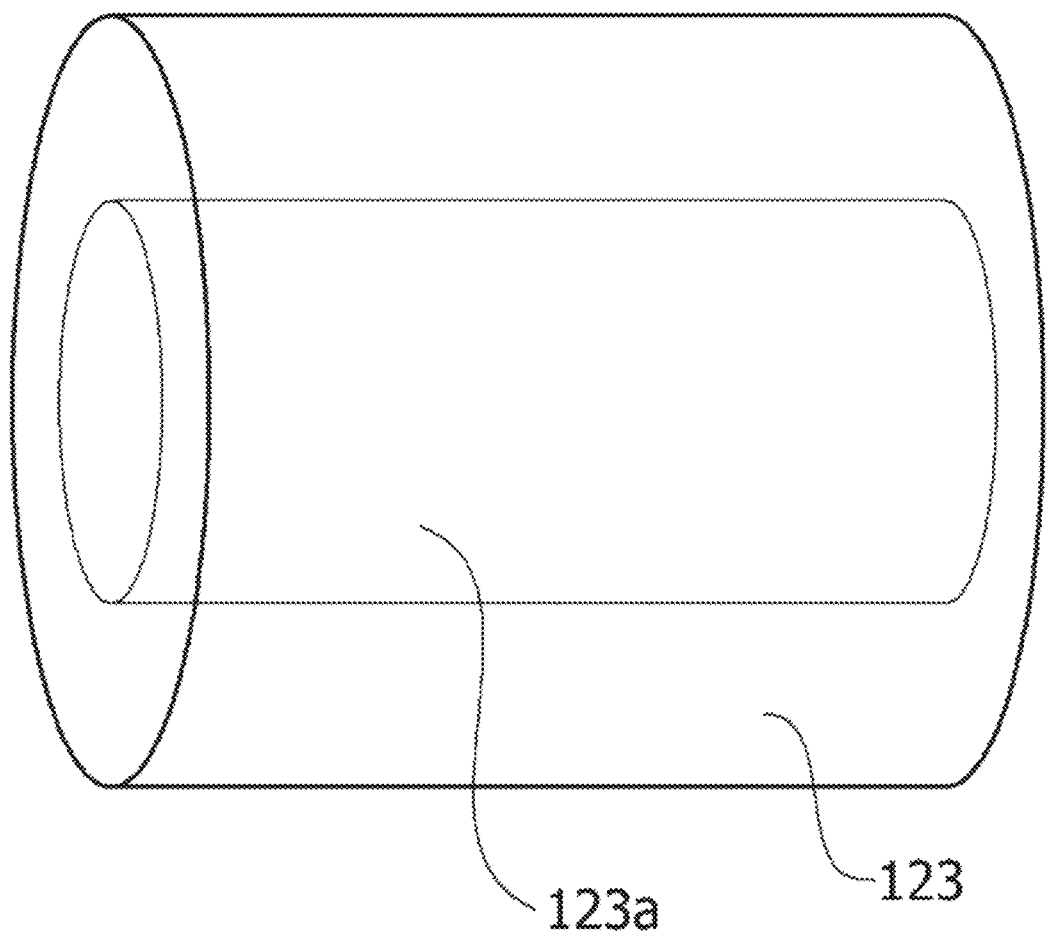
FIGS. 5A, 5B and t 5C are views illustrating unit forms of a high-temperature combustion catalyst.
Figure 5B:
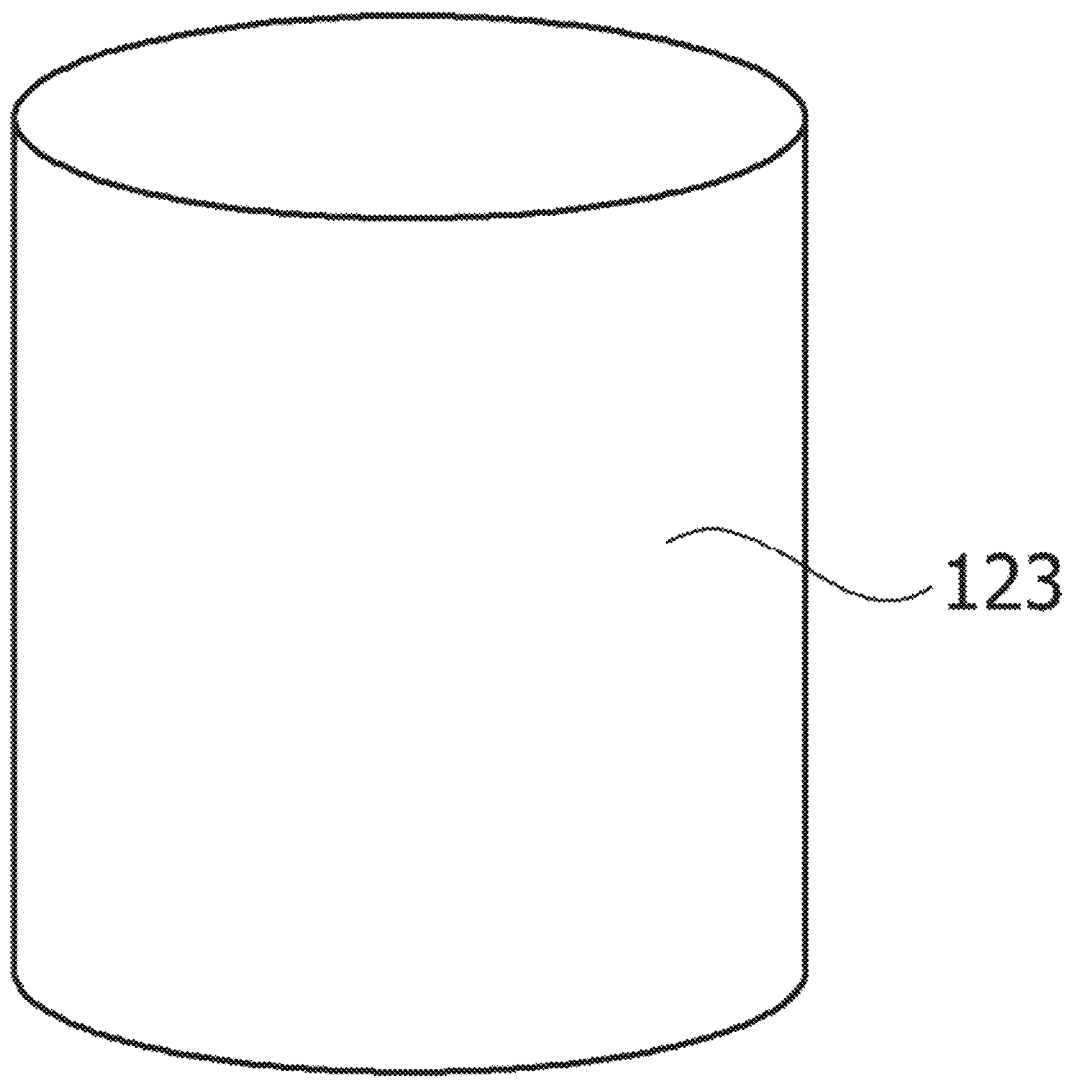
Figure 5C:
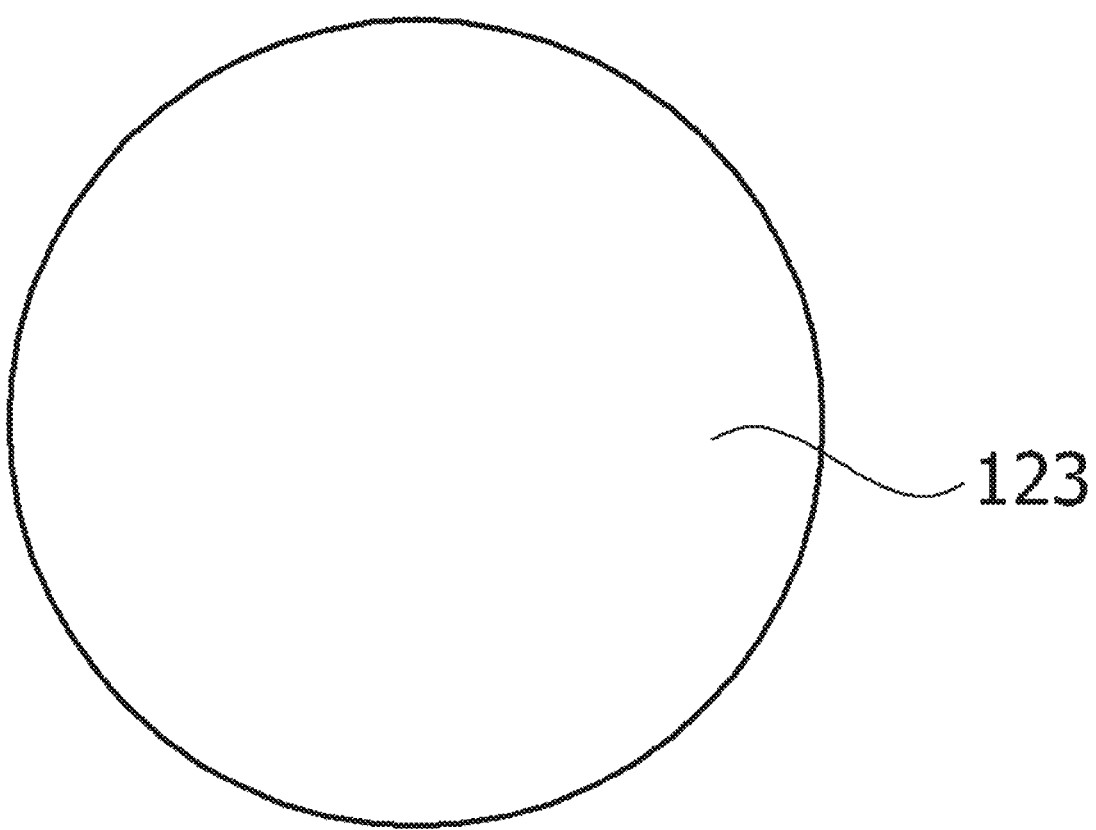

The high-temperature combustion catalyst 123 may take the form of grains, i.e., pellets, and, for example, as illustrated in FIGS. 5A to 5C, the high-temperature combustion catalyst 123 may have a cylindrical form, a circular cylindrical form, a spherical form, a hexahedral form, or the like. These types of the high-temperature combustion catalyst 123 may have pores 123a, and when these pores are formed, diffusion of the fuel gas is prevented and differential pressure is not applied, and thus the fuel gas is not concentrated on a specific site and uniformly passes.

Preferably, the pellets may have a size of 2 mm to 5 mm. When the size of the pellets is greater than the above range, the size of pores between pellets increases, and thus combustion efficiency is reduced. On the other hand, when the size of the pellets is less than the above range, the size of pores decreases, and thus a combustion gas pass rate is reduced, and accordingly, a problem in which ignited flame of the combustion catalyst unit 120 is flashed back to the premixing chamber 130 occurs, and therefore, the above-described size range should be maintained.

For reference, the high-temperature combustion catalyst 123 may be mass-produced through the following processes.

Figure 6:
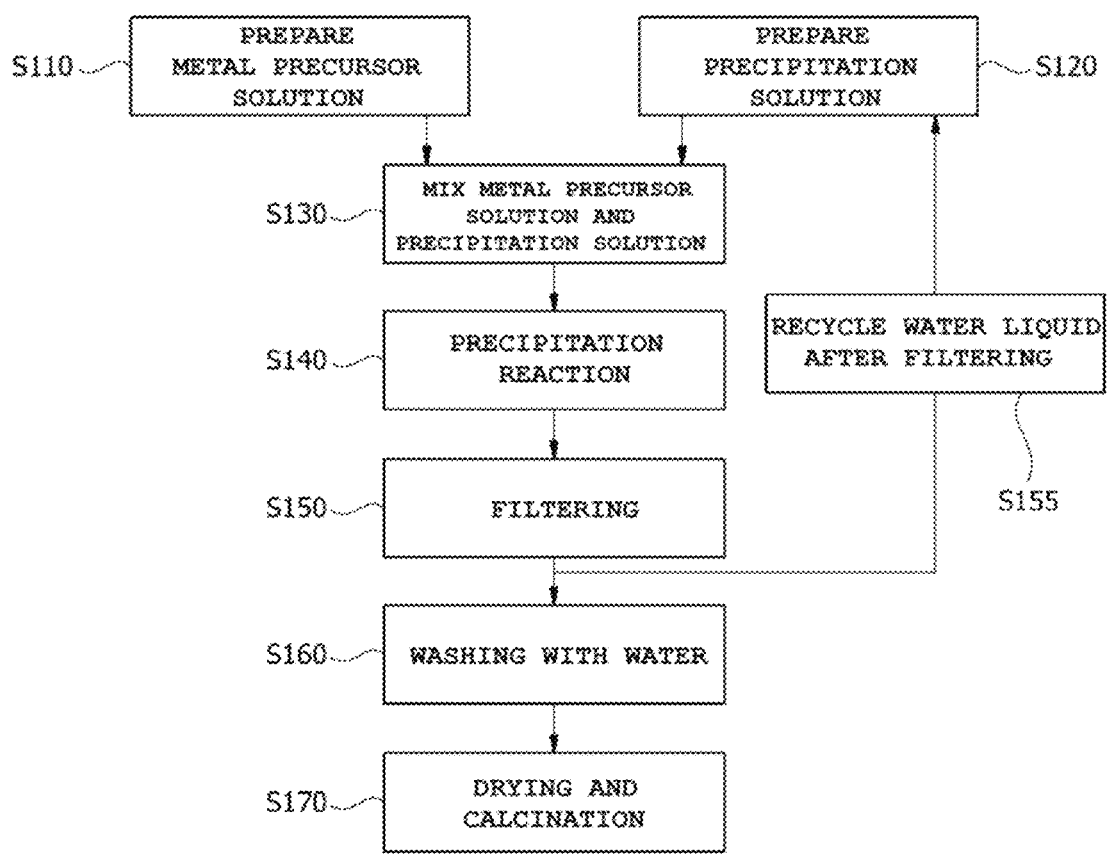
FIG. 6 is a block diagram for explaining a process of mass-producing a high-temperature combustion catalyst according to the present invention.

FIG. 6 is a block diagram for explaining a process of mass-producing a high-temperature combustion catalyst according to the present invention.

As illustrated in FIG. 6, a metal precursor solution including a transition metal nitrate, an alkaline earth metal nitrate, and aluminum nitrate is prepared (operation S110). A molar ratio of transition metal nitrate to alkaline earth metal to aluminum nitrate may be (1−x):(1−y):11 wherein x is a number ranging from 0.1 to 0.5 and y is a number ranging from 0.1 to 0.5. The transition metal nitrate may include at least one selected from manganese, cobalt, iron, and chromium. An alkaline earth metal may include at least one selected from calcium, strontium, and radium. Preparation of the metal precursor solution may be performed by dissolving a transition metal nitrate, an alkaline metal nitrate, and aluminum nitrate in distilled water.

A precipitation solution is prepared (operation S120). Preparation of the precipitation solution may be performed by stirring urea in distilled water. The concentration of urea in the precipitation solution may be 12 times that of metal precursors of the metal precursor solution.

The metal precursor solution and the precipitation solution are mixed (operation S130) to prepare a mixed solution. After preparation of the mixed solution, the temperature of the mixed solution is raised to 90° C. to 100° C. and the mixed solution is maintained for 10 hours to 48 hours to cause a precipitation reaction (operation S140). The precipitation reaction of the mixed solution may be performed by homogeneous solution precipitation.

A precipitate slurry formed by the precipitation reaction is filtered (operation S150) to be separated from the mixed solution. The resulting mixed solution from which the filtered precipitate slurry is separated may be recycled in the precipitation solution preparation process (operation S155). The precipitate slurry is washed with water (operation S160).

To remove moisture from the washed precipitate slurry, drying is performed (operation 170). The washed precipitate slurry may be dried at a temperature ranging from 100° C. to 150° C.

To remove moisture remaining in the dried precipitate slurry, calcination is performed at 1,000° C. to 1,500° C. (operation S170). The calcined precipitate slurry has a hexaaluminate structure and a specific surface area ranging from 5 m$^2$/g to 150 m$^2$/g.

The homogenous solution precipitation applied to the high-temperature combustion catalyst preparation method according to the present invention is simple and facilitates a process design for mass production, unlike other precipitation methods. In co-precipitation, which is widely used as a general catalyst preparation method, a basic material such as sodium carbonate ($Na_2CO_3$), sodium hydroxide (NaOH), or the like is used as a precipitant for synthesizing a catalyst and an acidic material, such as a metal nitrate or the like, is used as a metal precursor. A salt produced by an acid neutralization reaction of these two materials is used as a catalyst. In this process, pH adjustment is an important factor that determines physical properties and performance of the catalyst. However, control of a pH adjustment rate is relatively difficult and complicated. Due to this process, it is relatively difficult to repeatedly mass produce catalysts with uniform quality.

When homogeneous solution precipitation is used in the high-temperature combustion catalyst preparation method according to the present invention, the pH adjustment problem may be addressed and high-temperature combustion catalysts with uniform quality may be repeatedly mass-produced. Urea used as a precipitant in homogeneous solution precipitation is decomposed into ammonia ($NH_3$) and carbon dioxide gas ($CO_2$) at a temperature between 90° C. and 100° C. and reacts with metal precursors. At this time, the precipitation reaction uniformly occurs in the total solution, and pH is naturally maintained at 7. In co-precipitation using sodium hydroxide or the like as a precipitant, first, a precipitation reaction locally occurs only in a portion where the precipitant is introduced and high pH is instantaneously exhibited only in the portion, and thus strong stirring is required, and it is difficult to secure uniformity, and thus it is difficult to produce catalysts with uniform quality. On the other hand, when homogeneous solution precipitation is used, these problems may be addressed, and thus high-temperature combustion catalysts with uniform quality may be relatively simply produced.

In the filtering and washing processes, when co-precipitation using sodium hydroxide or the like as a precipitant is used, impurities such as sodium (Na), a nitrate, or the like remaining in the precipitate slurry should be removed, and these impurities are removed only when dissolved in a large amount of distilled water. These impurities deteriorate physical properties and performance of the catalyst, and thus the filtering and washing processes should be strictly performed. At this time, the amount of distilled water used is three to four or more times that of distilled water used in synthesizing the catalyst. On the other hand, impurities produced in homogenous solution precipitation are ammonium nitrate ($NH_4NO_3$) or unreacted urea, and these impurities are satisfactorily dissolved even in a small amount of distilled water, thus being easily removed, and may be removed even by heat. Thus, in the homogeneous solution precipitation method, deterioration of physical properties and performance of the catalyst due to impurities hardly occurs unlike a general co-precipitation method, and manufacturing costs may be reduced due to such manufacturing simplicity.

In addition, after the precipitation reaction, most of the wastewater generated in the filtering process is unreacted urea, and thus may be reused as a precipitation solution which acts as a precipitant. Only the same concentration of urea as that of a precursor in the precipitation solution used in an excess amount in the precipitation reaction is used in the precipitation reaction and the remaining urea remains. An excess amount of urea is used such that a precipitation reaction rate smoothly proceeds towards a forward reaction. Thus, only a part of urea in the precipitation solution is used and the remainder is included in a filtrate. When only a theoretical amount of urea used in a filtrate is additionally used, the urea may be recycled as a precipitation solution.

In addition, the washing process is also simple when compared to an existing co-precipitation method because an impurity remaining in the precipitate after the filtering process remains in the form of ammonium nitrate produced after reaction, and the ammonium nitrate is sufficiently removed even using only about half the amount of distilled water used in the reaction and may be completely removed even in the drying and calcining processes. In addition, a small amount of wastewater generated herein may also be reused. Thus, the high-temperature combustion catalyst preparation method according to an embodiment of the present invention may be regarded as a harmless preparation method by which almost no waste liquid is discarded.

In the drying and calcining processes, the precipitate slurry is dried at about 100° C. for 10 hours or more to remove remaining moisture. In addition, the calcination process may be performed at 1,000° C. for about 1 hour or more, thereby preparing a high-temperature combustion catalyst capable of maintaining performance and durability at high temperature.

Hereinafter, a method of preparing a high-temperature combustion catalyst, according to the present invention will be described in further detail.

1. Preparation of Metal Precursor Solution

Reagents, i.e., manganese nitrate ($Mn(NO_3)_2 \cdot 6H_2O$), barium nitrate and aluminum ($Ba(NO_3)_2$), nitrate ($Al(NO_3)_3 \cdot 9H_2O$), which are in the form of nitrates of manganese (Mn), barium (Ba), and aluminum (Al), were used as metal precursors. Manganese, aluminum, and barium, which are components of a high-temperature combustion catalyst, are dissolved in distilled water in a molar ratio of 1:10:1.

2. Preparation of Urea Solution

Urea is also stirred in distilled water to prepare a urea solution. The concentration of the urea solution is about 12 times that of the metal precursors.

3. Mixing

The metal precursor solution and the urea solution, which have the same volume, are mixed in a synthesis reactor to prepare a mixed solution. The mixed solution is uniformly and satisfactorily stirred.

4. Precipitation Reaction

The temperature of the synthesis reactor is raised to about 95° C., and the mixed solution is held at the temperature for 24 hours or more while being vigorously stirred.

5. Filtering

To remove ammonium nitrate remaining in a precipitate slurry obtained by the homogeneous solution precipitation method, a small amount of unreacted urea, impurities as metal precursors, and water, a filtering process is performed. A filter is installed in a Buchner funnel, and then the precipitate slurry is introduced thereinto to be separated into the filtered precipitate slurry and waste liquid. In this regard, the waste liquid may be recycled as a urea solution by adding urea to be reused (when the concentration of metal precursors is 1 M, urea is also added in an amount of 1 M) thereto.

6. Washing with Water

After the waste liquid is separated, the ammonium nitrate remaining in the precipitate slurry is removed by passing a small amount of distilled water through the precipitate slurry. In this regard, the generated waste liquid may be stored and reused later in the washing process when a high-temperature combustion catalyst is prepared.

7. Drying and Calcination

To completely remove moisture remaining in the precipitate slurry form which impurities and water have been removed, a drying process is performed in a drying oven at about 100° C. for about 10 hours or more. Thereafter, to prepare a high-temperature combustion catalyst, which is a final product, the temperature of the dried precipitate slurry is raised to 1,200° C. at a heating rate of about 3° C./min, and then the resulting precipitate slurry is maintained for about 6 hours.

Figure 7:
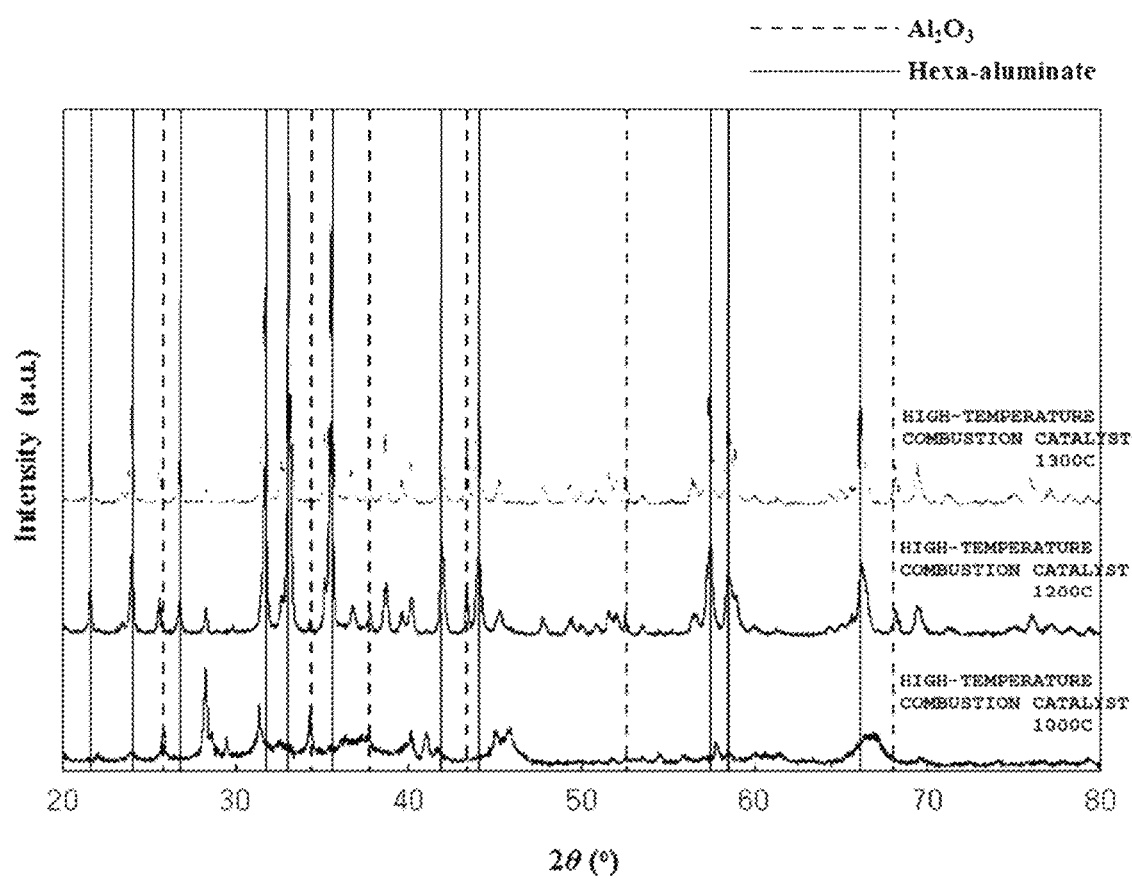
FIG. 7 is a graph showing analysis results of a high-temperature combustion catalyst according to the present invention.

FIG. 7 is a graph showing analysis results of a high-temperature combustion catalyst prepared according to an embodiment of the present invention.

Referring to FIG. 7, structure and physical properties, i.e., specific surface area, pore volume, pore size, and the like of the high-temperature combustion catalyst were analyzed. To analyze the structure of the high-temperature combustion catalyst, an X-ray diffractometer (XRD) was used. FIG. 2 is a graph showing analysis results of the structure of the high-temperature combustion catalyst according to calcination temperature. From this graph, it can be seen that samples treated at a calcination temperature of the high-temperature combustion catalyst of about 1,200° C. or more have a hexa-aluminate structure. In addition, it can be seen that the sample calcined at 1,000° C. is unable to form complete hexa-aluminate and some alumina ($Al_2O_3$) peaks are observed in this case.

Table 1 shows calculation results using nitrogen (N) adsorption to measure specific surface area, pore volume, and pore size of the high-temperature combustion catalyst. The specific surface area and pore volume of the high-temperature combustion catalyst were rapidly reduced according to an increase in calcination temperature. In this regard, the sample calcined at 1,200° C. had a hexa-aluminate structure, a relatively wide specific surface area, and a relatively large pore volume. Thus, calcination at about 1,200° C. may be a condition for preparing a high-temperature combustion catalyst having excellent performance.

TABLE 1

| Calcination temperature (° C.) of combustion catalyst | Specific surface area (m²/g-cat.) | Pore volume (m³/g-cat.) | Pore size (nm) |
| --- | --- | --- | --- |
| 1,000 | 42 | 0.30 | 24 |
| 1,200 | 14 | 0.11 | 22 |
| 1,300 | 8 | 0.04 | 22 |

Figure 8A:
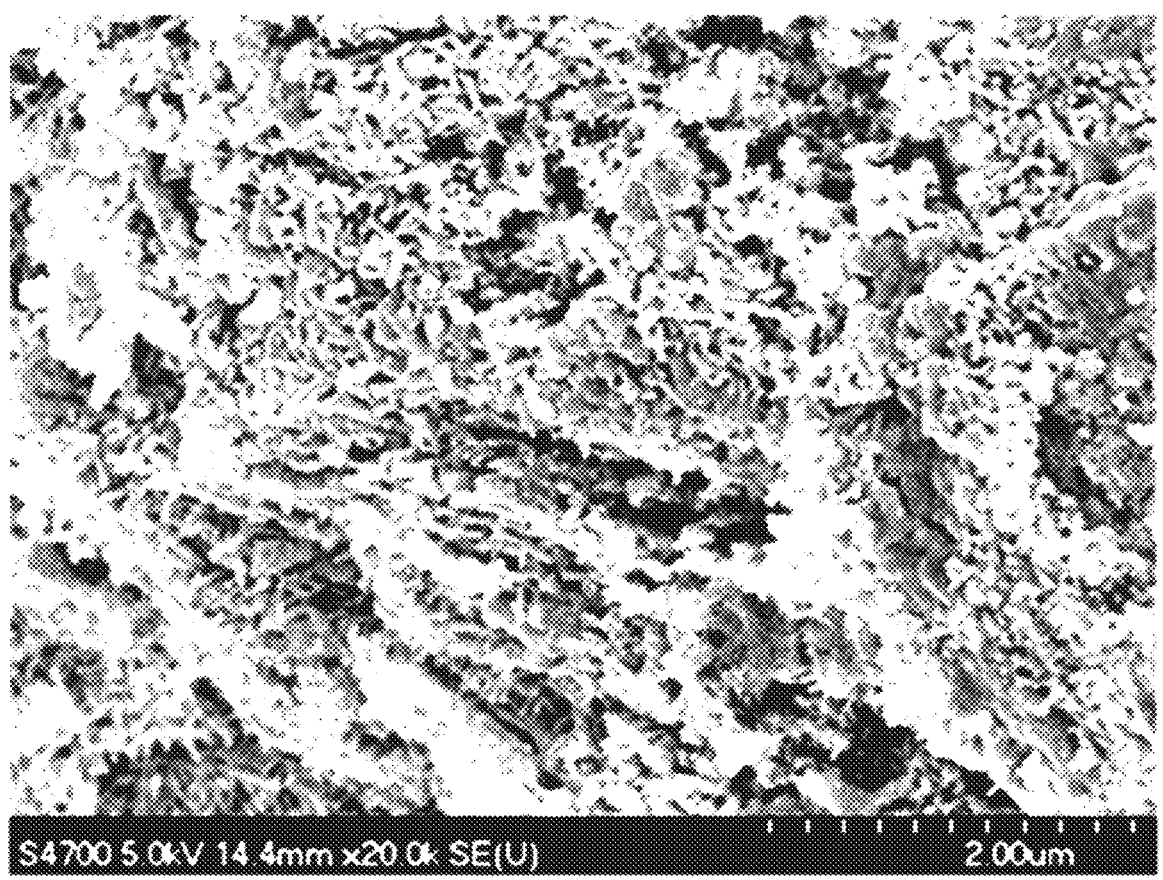
FIGS. 8A, 8B and 8C are graphs showing analysis results of a high-temperature combustion catalyst according to the present invention.
Figure 8B:
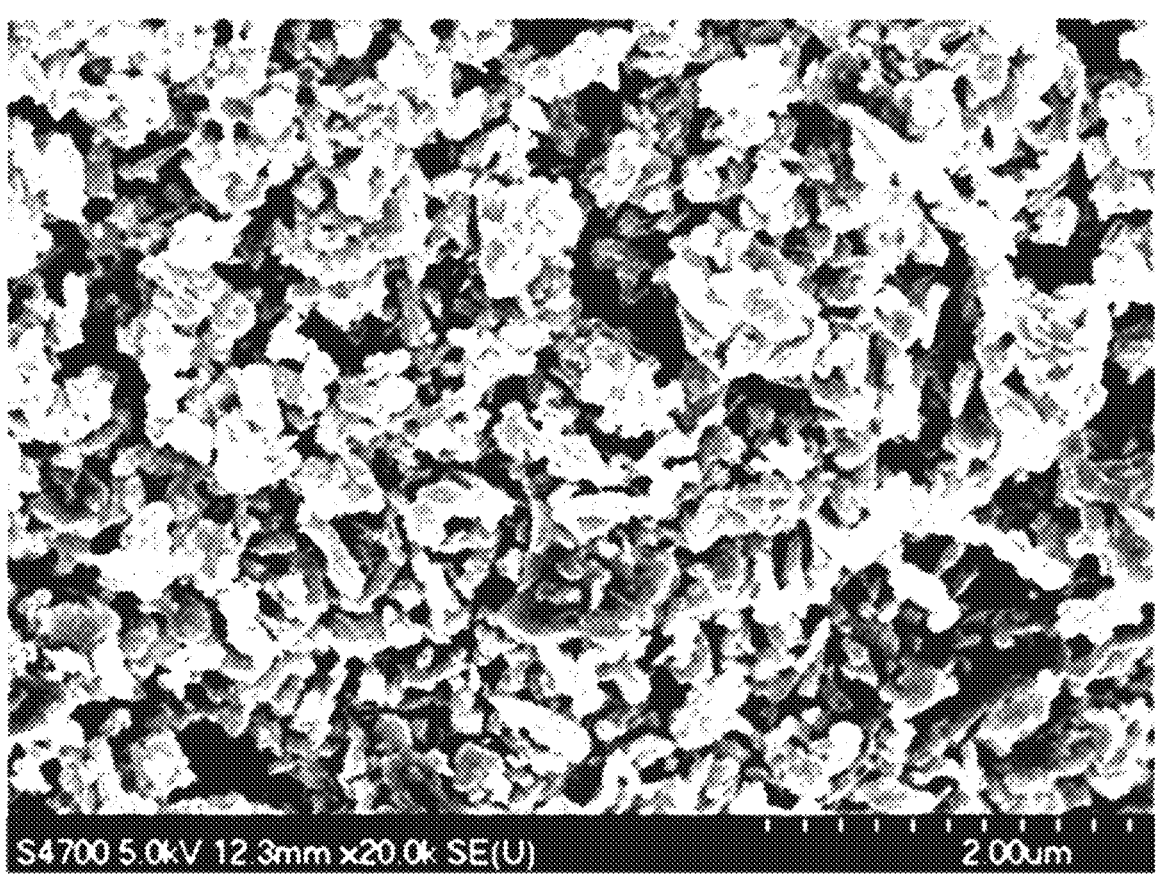
Figure 8C:
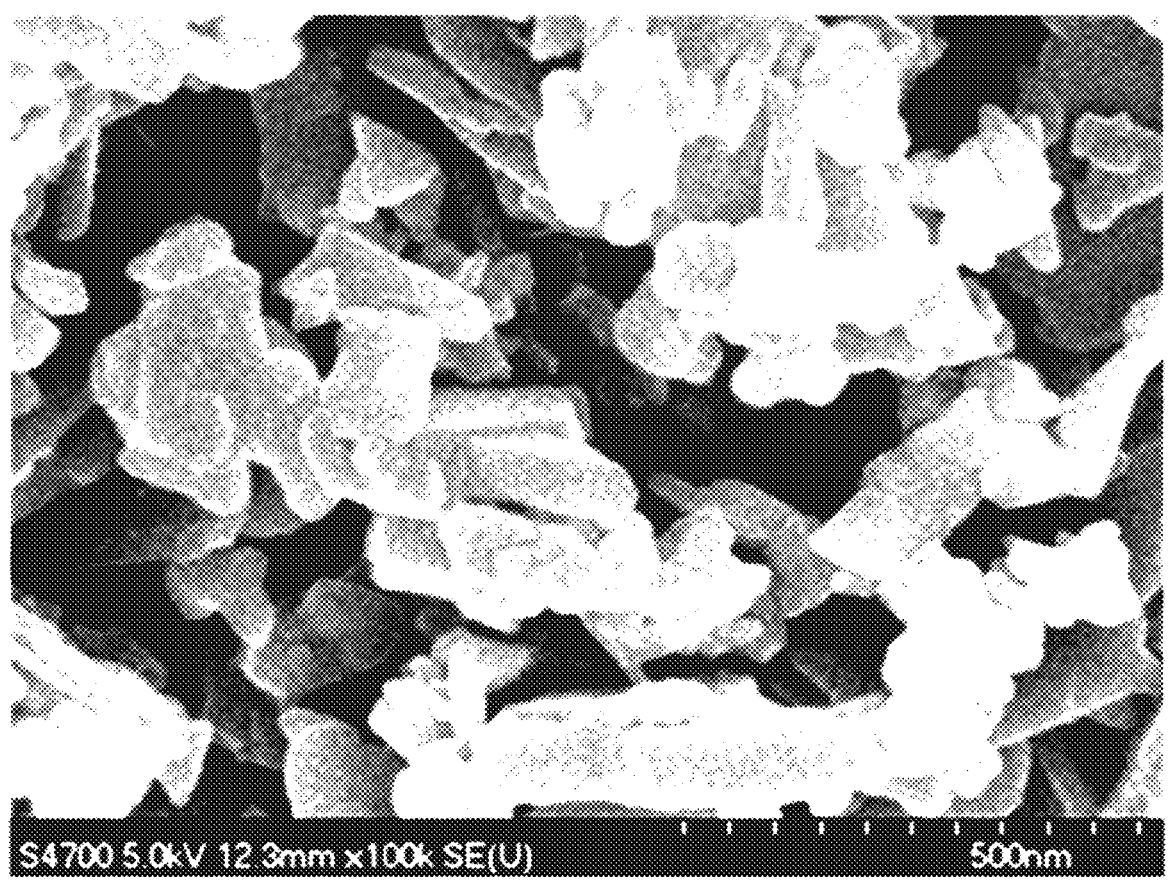

FIGS. 8A to 8C are images showing analysis results of a high-temperature combustion catalyst prepared according to an embodiment of the present invention.

FIG. 8A is a scanning electron microscope (SEM) image for a high-temperature combustion catalyst calcined at 600° C. FIGS. 8B and 8C are SEM images of a high-temperature combustion catalyst calcined at 1,200° C. FIGS. 8A and 8B are images obtained at a magnification of 20,000×, and FIG. 8C is an image obtained at a magnification of 100,000×.

Referring to FIGS. 8A to 8C, it can be seen that the calcination temperature increases, the size of particles of the high-temperature combustion catalyst increases, and it was confirmed that pores of about 100 nm were uniformly distributed in the high-temperature combustion catalyst calcined at 1,200° C.

Figure 9:
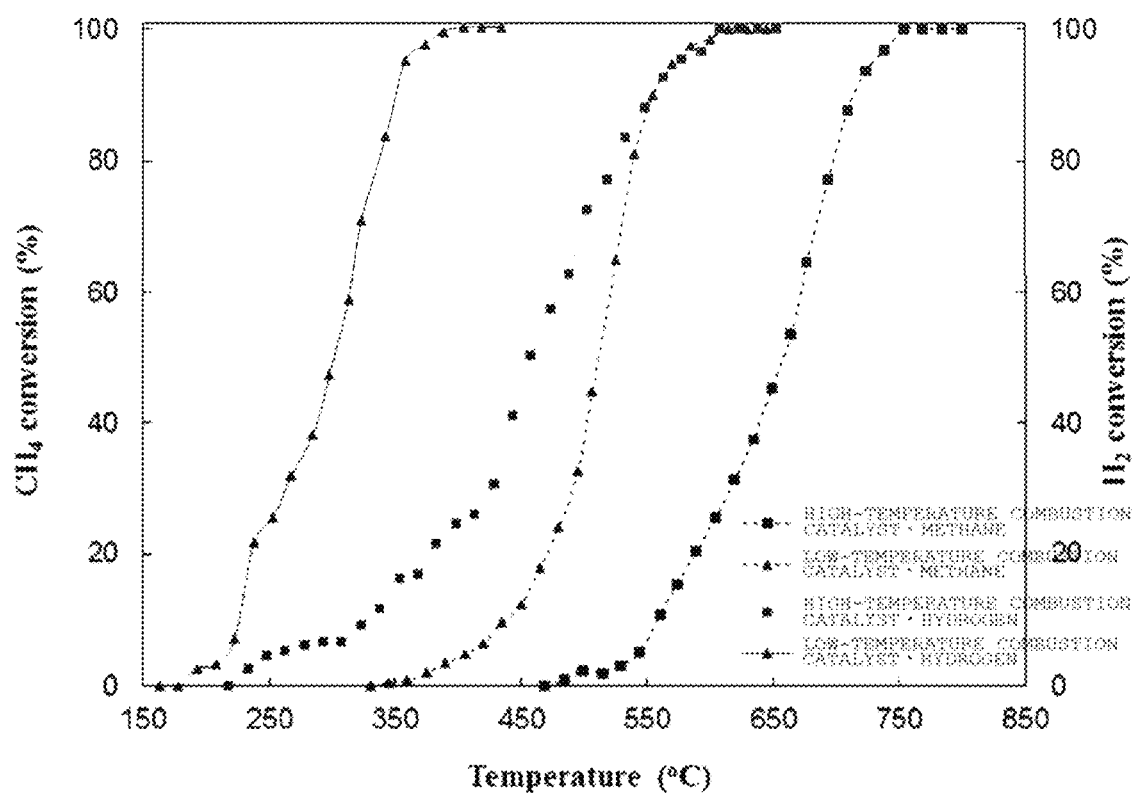
FIGS. 9 and 10 are graphs showing experimental results of the performance of a high-temperature combustion catalyst according to the present invention.
Figure 10:
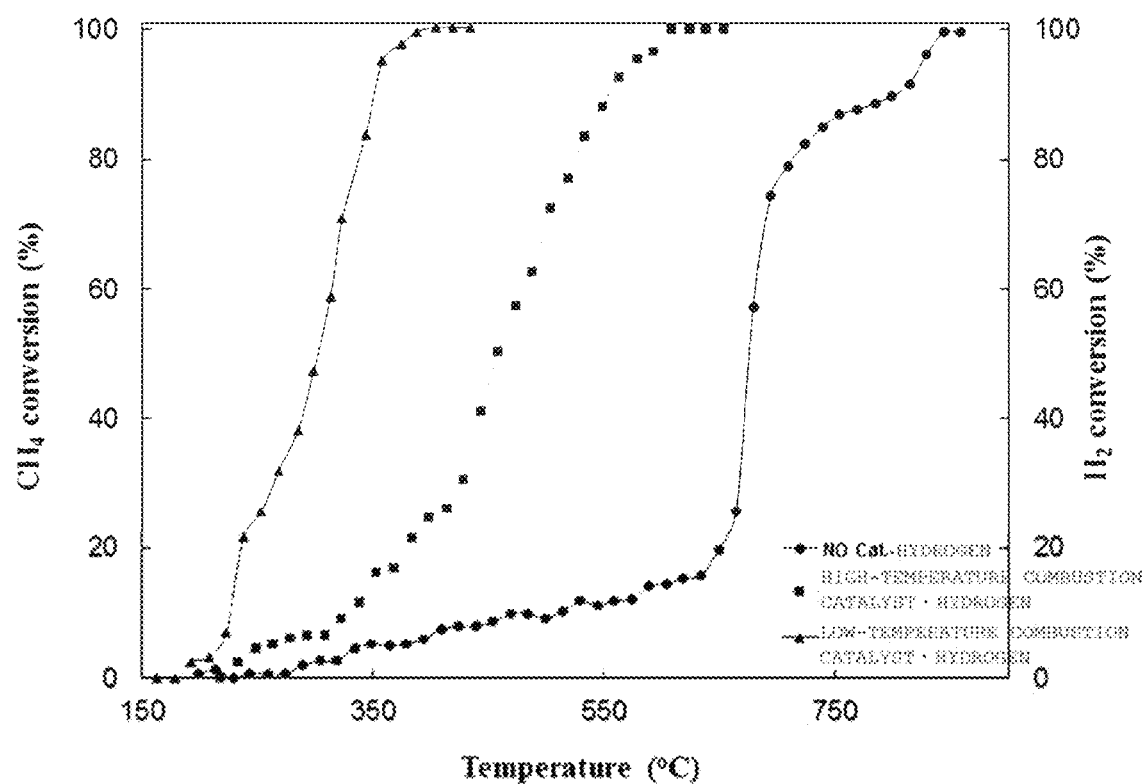

FIGS. 9 and 10 are graphs showing experimental results of the performance of a high-temperature combustion catalyst prepared according to an embodiment of the present invention.

To analyze methane ($CH_4$) combustion performance of the high-temperature combustion catalyst, a combustion reaction experiment was conducted in a fixed-bed reactor made of a ¼ inch quartz tube. The experiment was performed using an amount of high-temperature combustion catalyst of 250 mg (particle diameter: 150 μm to 250 μm) and at a methane flow rate of 3 ml/min and an air flow rate of 90 ml/min. Gases generated after the combustion reaction were analyzed by gas chromatography (GC, Agilent 3000 Micro GC).

In addition, comparison with methane combustion performance of a commercial low-temperature combustion catalyst was conducted. Also, a comparison in hydrogen ($H_2$) combustion performance between the catalysts was conducted. The experiment was performed at the same flow rate of methane of 3 ml/min and the same flow rate of air of 90 ml/min.

Referring to FIG. 9, for the low-temperature combustion catalysts, complete combustion of hydrogen and methane occurred at 300° C. and 550° C., respectively, and for the high-temperature combustion catalysts, complete combustion of hydrogen and methane occurred at 550° C. and 750° C., respectively.

Referring to FIG. 10, comparison with hydrogen combustion experimental results under a catalyst-free condition was also conducted. As a result, it can be seen that complete combustion of hydrogen was difficult even at a temperature of 800° C. or more.

Even in the combustion reaction experimental results, it can be seen that, for the high-temperature combustion catalysts, combustion of methane and hydrogen smoothly occurs at 750° C. or more and 550° C. or more, respectively, and the high-temperature combustion catalysts enable complete combustion and lean combustion, which is necessary for equipment requiring high temperature and clean energy, such as burners.

Figure 4:
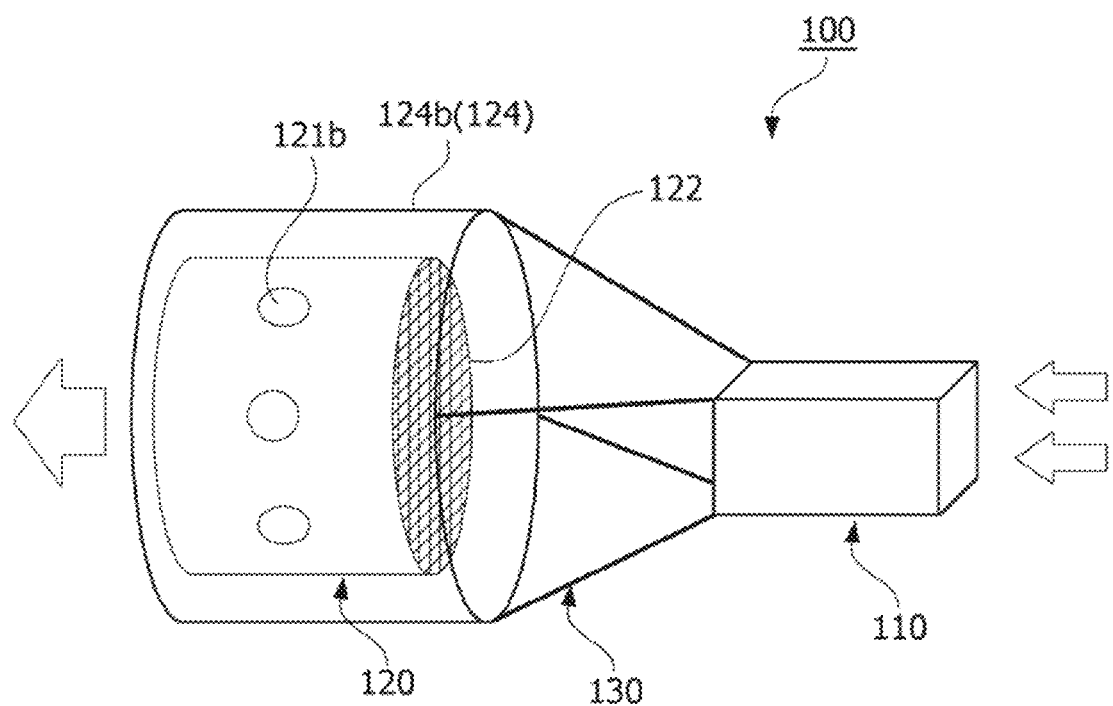
FIG. 4 is a configuration view of a burner using a high-temperature combustion catalyst, according to another embodiment of the present invention.

In addition, the heat source means 124 of the combustion catalyst unit 120 may be an ignition unit installed on the front side of the housing 121 as illustrated in FIG. 1 and capable of performing catalytic combustion on the combustion catalyst by ignition heat, or unlike this, may be an electric furnace 124b installed to cover the outside of the housing 121 as illustrated in FIG. 4 or an electric heater (not shown).

Although the present invention has been described in detail with reference to particular embodiments thereof, these embodiments are provided only for illustrative purposes and are not intended to limit the scope of the present invention. It will be obvious to those of ordinary skill in the art that changes or modifications may be made within the technical spirit of the present invention.

All simple changes or modifications of the present invention are within the scope of the present invention and the scope of the present invention may be defined by the appended claims.

What is claimed is:

1. A burner using a high-temperature combustion catalyst, the burner comprising: a mixing and dispensing unit configured to mix a fuel gas and air, which are to be supplied, and dispense the mixture; a combustion catalyst unit configured to generate heat by a catalytic combustion reaction with the fuel gas supplied from the mixing and dispensing unit; and a premixing chamber configured to pre-mix the fuel gas introduced into the combustion catalyst unit while connecting the mixing and dispensing unit to the combustion catalyst unit, wherein the combustion catalyst unit comprises: a housing having a chamber therein and openings at front and rear sides thereof; perforated plates installed on front and rear surfaces of the housing and allowing the fuel gas to pass from the rear side to the front side of the housing; a pellet-type combustion catalyst with which an inside of the chamber of the housing is filled; and a heat source means configured to generate a heat source for catalytic combustion of the combustion catalyst, the high-temperature combustion catalyst is prepared by preparing a metal precursor solution including a transition metal nitrate, an alkaline earth metal nitrate, and aluminum nitrate; preparing a precipitation solution; preparing a mixed solution by mixing the metal precursor solution and the precipitation solution; raising a temperature of the mixed solution to 90° C. to 100° C. and holding the mixed solution at 90° C. to 100° C. for 10 hours to 48 hours to cause a precipitation reaction; filtering a precipitate slurry formed by the precipitation reaction to be separated from the mixed solution; washing the precipitate slurry with water; drying the washed precipitate slurry to remove moisture therefrom; and performing calcination at 1,000° C. to 1,500° C. to remove moisture remaining in the dried precipitate slurry, and wherein the housing is provided, at edge surfaces thereof, with catalyst replacement holes through which the high-temperature combustion catalyst is discharged and introduced, for replacement of the high-temperature combustion catalyst, wherein the catalyst replacement holes are selectively opened or closed by thread caps.

2. The burner of claim 1, wherein the heat source means is an ignition unit installed at the front side of the housing and configured to perform catalytic combustion of the high-temperature combustion catalyst by ignition heat.

3. The burner of claim 1, wherein the heat source means is an electric furnace or electric heater installed such that the heat source means covers an outside of the housing, and configured to perform catalytic combustion on the high-temperature combustion catalyst.

4. The burner of claim 1, wherein, assuming that a combustion gas hourly space velocity (GHSV) of the combustion catalyst unit ranges from 1,000 $h^{-1}$ to 30,000 $h^{-1}$, the combustion catalyst unit has a volume of 1 L to 1.5 L, and the high-temperature combustion catalyst has a density of 0.5 g/ml to 1 g/ml and a porosity (a ratio of space volume to total volume of the combustion catalyst) of 0.3% to 0.5, such that a ratio of pressure drop at a discharge side of the combustion catalyst unit to pressure drop in the premixing chamber is maintained within 20%.

5. The burner of claim 1, wherein the high-temperature combustion catalyst has pores therein and any one form selected from a cylindrical form, a hexahedral form, and a spherical form.

6. The burner of claim 1, wherein the high-temperature combustion catalyst is a hexa-aluminate-based catalyst.

7. The burner of claim 1, wherein the housing is made of stainless or Hastelloy, the stainless steel or Hastelloy being a heat-resistant material.

8. The burner of claim 1, wherein the mixing and dispensing unit comprises: a blowing fan configured to blow the fuel gas and the air towards the combustion catalyst unit; and a static mixer configured to mix the fuel gas and the air that are blown by the blowing fan.

9. A burner using a high-temperature combustion catalyst, the burner comprising: a mixing and dispensing unit configured to mix a fuel gas and air, which are to be supplied, and dispense the mixture; a combustion catalyst unit configured to generate heat by a catalytic combustion reaction with the fuel gas supplied from the mixing and dispensing unit; and a premixing chamber configured to pre-mix the fuel gas introduced into the combustion catalyst unit while connecting the mixing and dispensing unit to the combustion catalyst unit, wherein the combustion catalyst unit comprises: a housing having a chamber therein and openings at front and rear sides thereof; perforated plates installed on front and rear surfaces of the housing and allowing the fuel gas to pass from the rear side to the front side of the housing; a pellet-type combustion catalyst with which an inside of the chamber of the housing is filled; and a heat source means configured to generate a heat source for catalytic combustion of the combustion catalyst, and the high-temperature combustion catalyst is prepared by preparing a metal precursor solution including a transition metal nitrate, an alkaline earth metal nitrate, and aluminum nitrate; preparing a precipitation solution; preparing a mixed solution by mixing the metal precursor solution and the precipitation solution; raising a temperature of the mixed solution to 90° C. to 100° C. and holding the mixed solution at 90° C. to 100° C. for 10 hours to 48 hours to cause a precipitation reaction; filtering a precipitate slurry formed by the precipitation reaction to be separated from the mixed solution; washing the precipitate slurry with water; drying the washed precipitate slurry to remove moisture therefrom; and performing calcination at 1,000° C. to 1,500° C. to remove moisture remaining in the dried precipitate slurry;

wherein, assuming that a combustion gas hourly space velocity (GHSV) of the combustion catalyst unit ranges from 1,000 $h^{-1}$ to 30,000 $h^{-1}$, the combustion catalyst unit has a volume of 1 L to 1.5 L, and the high-temperature combustion catalyst has a density of 0.5 g/ml to 1 g/ml and a porosity (a ratio of space volume to total volume of the combustion catalyst) of 0.3% to 0.5, such that a ratio of pressure drop at a discharge side of the combustion catalyst unit to pressure drop in the premixing chamber is maintained within 20%.

* * * * *